US011981521B2

(12) United States Patent
Shimamura et al.

(10) Patent No.: US 11,981,521 B2
(45) Date of Patent: May 14, 2024

(54) FEEDING APPARATUS, PRINTING APPARATUS, AND CONTROL METHOD OF FEEDING APPARATUS

(71) Applicant: CANON KABUSHIKI KAISHA, Tokyo (JP)

(72) Inventors: Kenji Shimamura, Saitama (JP); Ryo Harigae, Toyko (JP)

(73) Assignee: Canon Kabushiki Kaisha, Tokyo (JP)

(*) Notice: Subject to any disclaimer, the term of this patent is extended or adjusted under 35 U.S.C. 154(b) by 519 days.

(21) Appl. No.: 17/197,424

(22) Filed: Mar. 10, 2021

(65) Prior Publication Data

US 2021/0284475 A1 Sep. 16, 2021

(30) Foreign Application Priority Data

Mar. 12, 2020 (JP) ................................ 2020-043331

(51) Int. Cl.
*B65H 23/16* (2006.01)
*B41J 15/04* (2006.01)
(Continued)

(52) U.S. Cl.
CPC ............ *B65H 23/16* (2013.01); *B41J 15/042* (2013.01); *B65H 16/103* (2013.01);
(Continued)

(58) Field of Classification Search
CPC .... B65H 23/16; B65H 23/005; B65H 23/048; B65H 23/038; B65H 19/105; B65H 19/10;
(Continued)

(56) References Cited

U.S. PATENT DOCUMENTS 5,249,754 A 10/1993 Liermann et al.
6,024,321 A * 2/2000 Miyake ................. B65H 16/08 242/562.1
(Continued)

FOREIGN PATENT DOCUMENTS

JP 01-267240 A 10/1989
JP 03-227860 A 10/1991
(Continued)

OTHER PUBLICATIONS

Office Action dated Feb. 5, 2024, in Japanese Patent Application No. 2020-043331.

*Primary Examiner* — Luis A Gonzalez
(74) *Attorney, Agent, or Firm* — Venable LLP

(57) ABSTRACT

A feeding apparatus includes a roll support unit configured to rotatably support a roll sheet which is a sheet wound into a roll form, a drive unit configured to rotate the roll sheet in a first rotation direction for feeding the sheet into a conveyance path and a second rotation direction, an abutment portion provided so as to be capable of abutting against an outer peripheral surface of the roll sheet at a first position, and a rotation member configured to abut against the outer peripheral surface at a second position. The rotation member at the second position does not rotate with the roll sheet when the roll sheet is rotated in the first rotation direction, and rotates with the roll sheet when the roll sheet is rotated in the second rotation direction.

20 Claims, 13 Drawing Sheets

(51) Int. Cl.

| | |
|---|---|
| ***B41J 15/16*** | (2006.01) |
| ***B65H 16/10*** | (2006.01) |
| ***B65H 19/10*** | (2006.01) |
| ***B65H 23/00*** | (2006.01) |
| ***B65H 23/04*** | (2006.01) |

(52) U.S. Cl.
CPC ......... *B65H 23/005* (2013.01); *B65H 23/048* (2013.01); *B41J 15/16* (2013.01)

(58) Field of Classification Search
CPC ....... B65H 16/103; B41J 15/16; B41J 15/042; B41J 15/046
See application file for complete search history.

(56) References Cited

U.S. PATENT DOCUMENTS

| | | | | |
|---|---|---|---|---|
| 9,969,192 | B2 | 5/2018 | Suzuki et al. | |
| 10,434,800 | B1 | 10/2019 | Colonel et al. | |
| 10,752,458 | B2 | 8/2020 | Wind et al. | |
| 10,807,822 | B2 | 10/2020 | Yamaya | |
| 10,906,764 | B2 | 2/2021 | Yoneyama et al. | |
| 11,560,000 | B2 | 1/2023 | Suto et al. | |
| 2009/0236463 | A1 | 9/2009 | Izumida et al. | |
| 2018/0281481 | A1 | 10/2018 | Yamaya | |
| 2018/0282085 | A1 | 10/2018 | Kinoshita | |
| 2021/0284475 | A1 | 9/2021 | Shimamura et al. | |
| 2021/0284476 | A1 * | 9/2021 | Harigae | B65H 23/16 |
| 2022/0355599 | A1 | 11/2022 | Hirama | |
| 2023/0136467 | A1 | 5/2023 | Vogt et al. | |

FOREIGN PATENT DOCUMENTS

| | | | |
|---|---|---|---|
| JP | 11-217139 | A | 8/1999 |
| JP | 2005-060017 | A | 3/2005 |

* cited by examiner

FEEDING APPARATUS, PRINTING APPARATUS, AND CONTROL METHOD OF FEEDING APPARATUS

BACKGROUND OF THE INVENTION

Field of the Invention

The present invention relates to a feeding technique of a roll sheet.

Description of the Related Art

In order to reduce the user's labor upon pulling out a sheet from a roll sheet and introducing it into the apparatus, there has been proposed a technique that automates part of the feeding operation. Japanese Patent Laid-Open No. 2005-60017 discloses an apparatus that rotates a roll sheet in a sheet feeding direction when it is detected that the leading edge of the roll sheet is separated from the outer peripheral surface of the roll sheet by its own weight.

The method by the apparatus disclosed in Japanese Patent Laid-Open No. 2005-60017 cannot be applied to a case in which the leading edge of the sheet is conveyed into a conveyance path from a direction in which the leading edge is difficult to be separated from the roll sheet by its own weight.

SUMMARY OF THE INVENTION

The present invention provides a technique that can more reliably introduce the leading edge of a roll sheet into a conveyance path.

According to an aspect of the present invention, there is provided a feeding apparatus comprising a roll support unit configured to rotatably support a roll sheet which is a sheet wound into a roll form, a drive unit configured to rotate the roll sheet supported by the roll support unit in a first rotation direction for feeding the sheet from the roll sheet into a conveyance path and a second rotation direction reverse to the first rotation direction, an abutment portion provided so as to be capable of abutting against an outer peripheral surface of the roll sheet at a first position, and a rotation member configured to abut against the outer peripheral surface at a second position different from the first position, wherein the drive unit rotates the roll sheet in the first rotation direction to introduce, into the conveyance path, a leading edge of the sheet having passed between the first position and the second position, the rotation member at the second position does not rotate with the roll sheet when the roll sheet is rotated in the first rotation direction, and rotates with the roll sheet when the roll sheet is rotated in the second rotation direction.

Further features of the present invention will become apparent from the following description of exemplary embodiments (with reference to the attached drawings).

DESCRIPTION OF THE EMBODIMENTS

Figure 1:
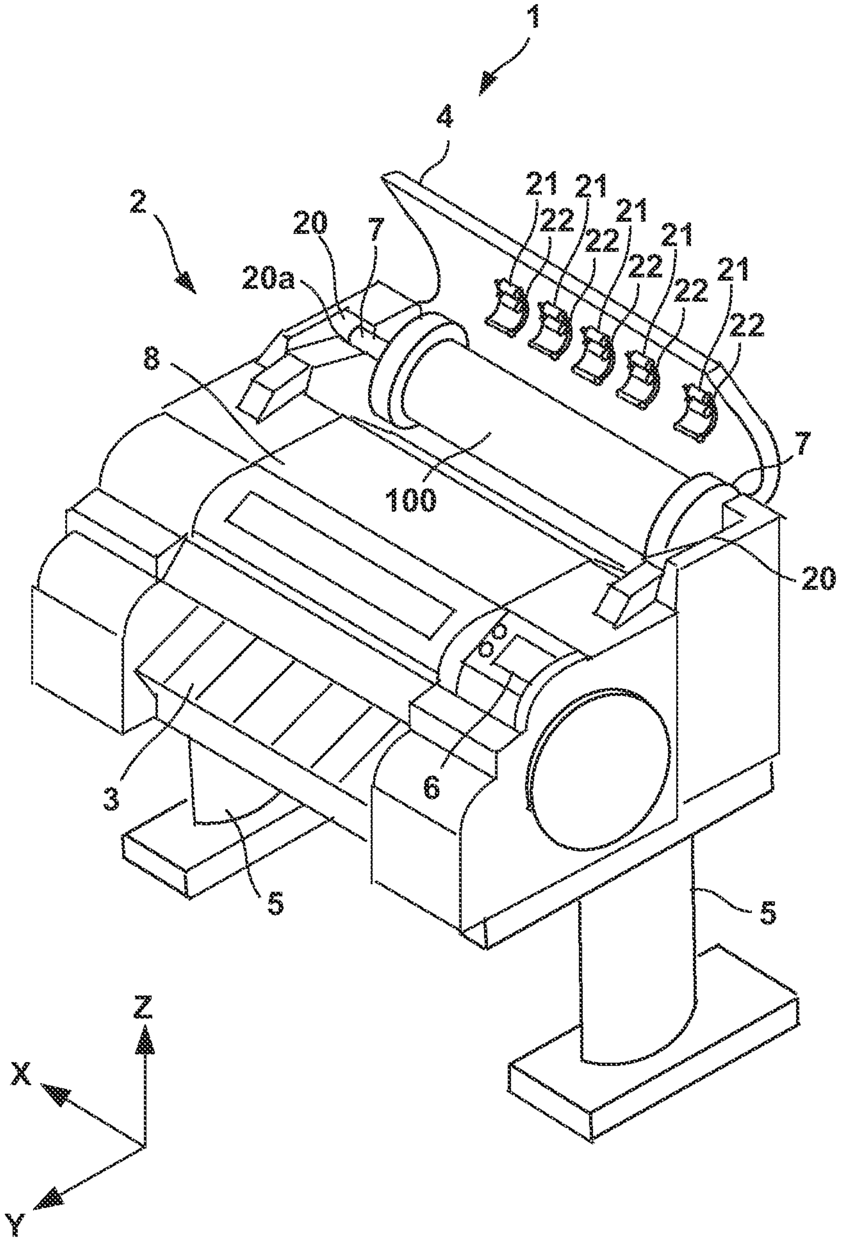
FIG. 1 is an external view of a printing apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Outline of Printing Apparatus>

Figure 2A:
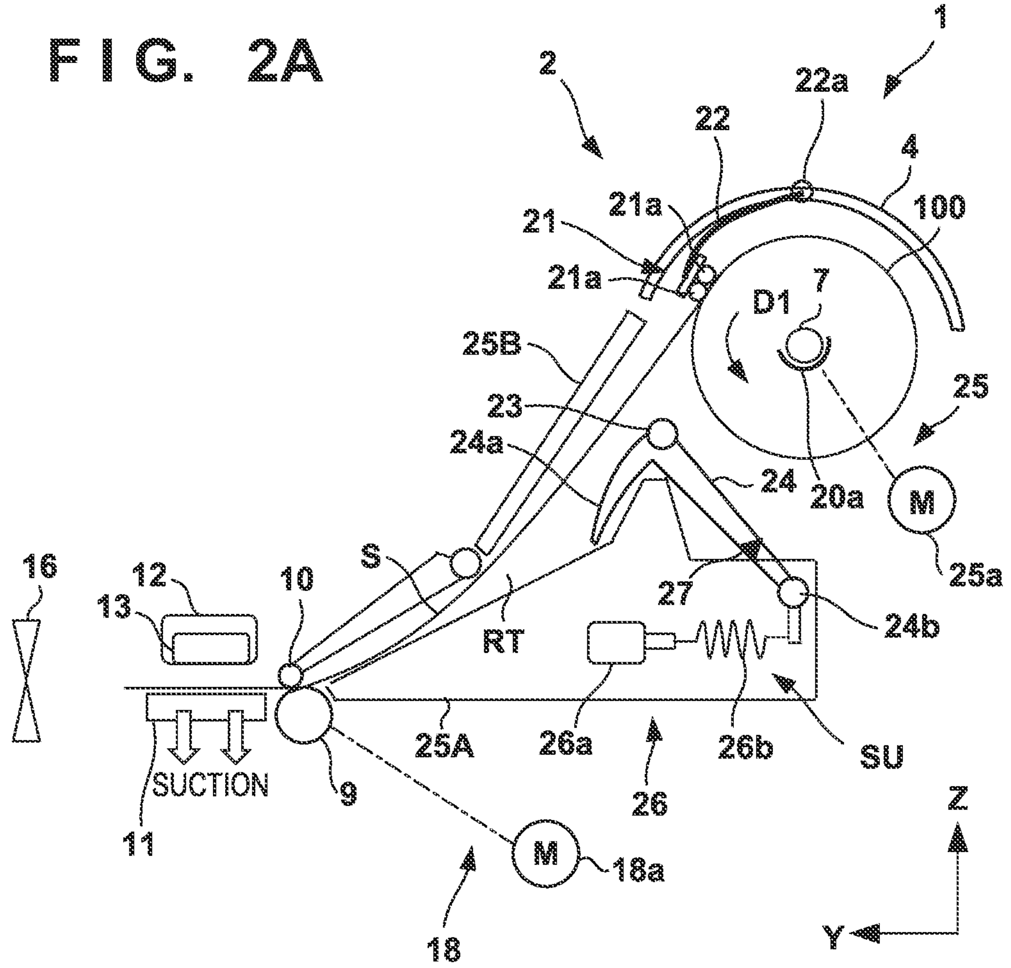
FIG. 2A is a schematic view showing the internal arrangement of the printing apparatus shown in FIG. 1.

FIG. 1 is an external view of a printing apparatus 1 in this embodiment. FIG. 2A is a schematic view showing the internal arrangement of the printing apparatus 1. In the drawings, X indicates the widthwise direction (left-and-right direction) of the printing apparatus 1, Y indicates the depth direction (front-and-rear direction) of the printing apparatus 1, and Z indicates the vertical direction. In this embodiment, a case will be described in which the present invention is applied to a serial inkjet printing apparatus. However, the present invention is applicable to a printing apparatus of another form.

Note that "printing" includes not only forming significant information such as characters and graphics but also forming images, figures, patterns, and the like on print media in a broad sense, or processing print media, regardless of whether the information formed is significant or insignificant or whether the information formed is visualized so that a human can visually perceive it. In addition, although in this embodiment, sheet-like paper is assumed as a "print medium" serving as a print target, sheet-like cloth, plastic film, and the like may be used as print media.

The printing apparatus 1 is supported by a pair of leg portions 5. A feeding apparatus 2 is provided on the far side (rear side) of the printing apparatus 1, and a discharge tray 3 is provided on the near side (front side). An operation panel 6, which is used by the user to input various settings and commands and check information, is provided on the upper surface of the printing apparatus 1.

The printing apparatus 1 is an apparatus that can pull out a sheet S from a roll sheet 100 and print an image thereon. The sheet S is one continuous sheet, and the roll sheet 100 is obtained by winding the sheet S into a roll form around a cylindrical core. The roll sheet 100 particularly indicates a roll portion of the sheet S.

The feeding apparatus 2 includes a roll support unit 20 that rotatably supports the roll sheet 100. Holders 7, which define the rotational center axis (X-direction axis) of the roll sheet 100, are detachably attached to both end portions of the roll sheet 100. By setting, in holding portions 20*a*, the roll sheet 100 with the holders 7 attached thereto, the user can perform printing on the roll sheet 100. The roll support unit 20 includes the left and right holding portions 20*a* each of which rotatably supports the spool shaft of the holder 7. Each holding portion 20*a* is a valley-shaped groove, and rotatably supports the shaft portion of the holder 7 in its bottom portion.

The feeding apparatus 2 includes a cover member 4 that covers the roll sheet 100 supported by the roll support unit 20. The cover member 4 is a member having an arc-shaped cross section, and provided so as to be openable/closable between a cover position (for example, the position shown in FIG. 2) where it covers the roll sheet 100 and a retreat position (for example, the position shown in FIG. 1) where it exposes the roll sheet 100 to the outside. The cover member 4 can protect the roll sheet 100 from adhesion of dust, and prevent the user from touching the roll sheet 100 during printing and disturbing the printed image.

The feeding apparatus 2 includes a feeding drive unit 25 that rotates the roll sheet 100 supported by the roll support unit 20 to feed it into a conveyance path RT. The drive unit 25 includes a feeding motor 25*a* as a driving source, and a transmission mechanism such as a gear mechanism that transmits the driving force of the feeding motor 25*a* to the spool gear of the holder 7. By rotating the feeding motor 25*a*, the sheet S of the roll sheet 100 can be fed into the conveyance path RT.

When the roll sheet 100 is set in the roll support unit 20, it is required to introduce the leading edge of the sheet S into the conveyance path RT. The feeding apparatus 2 includes a separation unit SU for separating the leading edge of the sheet S from the peripheral surface of the roll sheet 100 to automatically introduce it into the conveyance path RT. The details of the separation unit SU will be described later.

The conveyance path RT is formed as a space between an upper guide member 25B and a lower guide member 25A. A nip portion between a conveying roller 9 and a driven roller 10 is located in the downstream end of the conveyance path RT. The printing apparatus 1 includes a drive unit 18 that rotates the conveying roller 9. The drive unit 18 includes a conveyance motor 18*a* as a driving source, and a transmission mechanism such as a gear mechanism that transmits the driving force of the conveyance motor 18*a* to the conveying roller 9. By driving the conveyance motor 18*a*, when performing printing, the sheet S is nipped between the conveying roller 9 and the driven roller 10 and, by rotation of these rollers, conveyed onto a platen 11 arranged so as to face a printhead 13.

The platen 11 supports the sheet S from below, and guarantees a gap between the printhead 13 and the sheet S. A plurality of intake holes are formed in the platen 11, and the plurality of intake holes are connected to a suction fan (not shown) (a suction fan 17 shown in FIG. 3) via a duct. By driving the suction fan 17, a suction negative pressure is generated in the intake holes of the platen 11, and this enables the sheet S to be chucked and held on the platen 11.

The printhead 13 is mounted on a carriage 12. The carriage 12 is supported such that it can be reciprocated in the X direction (main scanning direction). The carriage 12 is reciprocated by a drive mechanism which uses a carriage motor 12*a* (FIG. 3) as a driving source.

The printhead 13 is provided with discharge ports (nozzles) that discharge ink. The ink is supplied to the printhead 13 from an ink reservoir (not shown). While the carriage 12 is moved, the ink is discharged from the printhead 13 onto the sheet S. With a discharge operation of the printhead 13 and movement of the carriage 12, an image for one line can be printed. By alternately repeating such image printing and intermittent conveyance of the sheet S by the conveying roller 9 in the Y direction (subscanning direction), an image for one page can be printed. A cutter 16 is arranged on the downstream side of the printhead 13 and the platen 11 in the conveyance direction of the sheet S. The cutter 16 cuts the sheet S in the X direction. Thus, a cut sheet with an image printed thereon can be obtained from the roll sheet 100.

The printing apparatus 1 includes an openable/closable top cover 8. When the top cover 8 is open, the mechanisms around the carriage 12 and the cutter 16 are exposed to the outside, and maintenance thereof can be performed.

<Separation Unit>

Figure 2B:
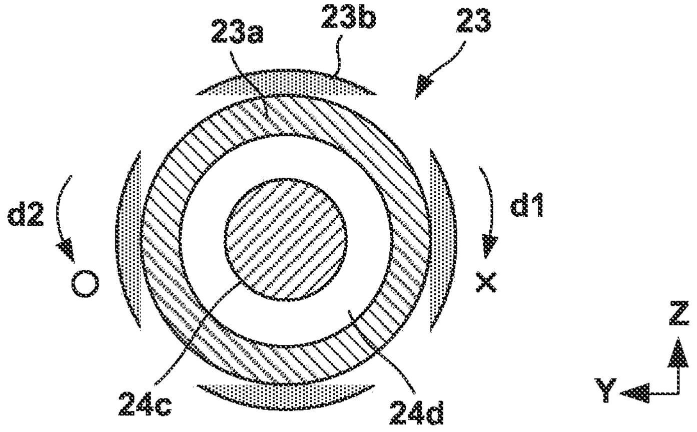
FIG. 2B is a sectional view of a rotation member.

With reference to FIGS. 2A and 2B, the separation unit SU will be described. The separation unit SU includes a rotation member 23, a support member 24 that supports the rotation member 23, and a drive unit 26. The rotation member 23 is supported by the support member 24 so as to be rotatable around the X-direction axis, and provided such that it can abut against the outer peripheral surface of the roll sheet 100.

FIG. 2B is a sectional view of the rotation member 23. The rotation member 23 is a free rotation roller that can freely rotate in one direction but rotation in the other direction is restricted. More specifically, the rotation member 23 includes a cylindrical main body 23*a* and rubber 23*b* that covers the outer peripheral surface of the main body 23*a*, and is supported on a support shaft 24*c* via a one-way clutch 24*d*. The one-way clutch 24*d* allows rotation of the rotation member 23 in a d2 direction but resists rotation of the rotation member 23 in a d1 direction. Let D1 be the rotation direction of the roll sheet 100 for feeding the sheet S, and D2 be the reverse rotation direction. While the rotation member 23 abuts against the outer peripheral surface of the roll sheet 100, the rotation member 23 does not follow the rotation of the roll sheet 100 in the D1 direction. On the other hand, the rotation member 23 rotates following the rotation of the roll sheet 100 in the D2 direction. When the leading edge of the sheet S is introduced into the conveyance path RT after the roll sheet 100 is set, the rotation member 23 is pressed against the outer peripheral surface of the roll sheet 100 but the one-way clutch 24*d* restricts the rotation of the rotation member 23 following the roll sheet 100. Therefore, the sheet S is crimped, and the leading edge of the sheet S is introduced into the conveyance path RT.

The support member 24 is an arm member that includes a guide portion 24*a* and the rotation member 23 in one end portion and is supported so as to be rotatable around a pivot shaft 24*b* in the other end portion. The guide portion 24*a* is extended in the direction of the conveyance path RT and, when the leading edge of the sheet S is introduced into the conveyance path RT after the roll sheet 100 is set, guides the sheet to the conveyance path RT. Since the rotation member 23 is adjacent to the guide portion 24*a*, the leading edge of the sheet S wound up by the rotation of the rotation member 23 can be guided by the guide portion 24a and more smoothly introduced into the conveyance path RT.

The drive unit 26 is a unit that displaces the support member 24. The drive unit 26 causes the support member 24 to pivot around the pivot shaft 24b. The drive unit 26 includes an electromagnetic solenoid (pull solenoid) 26a and an elastic member 26b that connects the plunger of the electromagnetic solenoid 26a and the end portion of the support member 24. The elastic member 26b is a tension spring.

In the non-driving state (OFF state) of the electromagnetic solenoid 26a, as shown in FIG. 2A, the support member 24 is located in a position (retreat position) where it leans against the guide member 25A due to its own weight. At this time, the rotation member 23 is also located in a retreat position spaced apart from the roll sheet 100. In the driving state (ON state) of the electromagnetic solenoid 26a, the lower end portion of the support member 24 is pulled by the electromagnetic solenoid 26a. With this operation, in FIG. 2A, the support member 24 pivots clockwise around the pivot shaft 24b and is displaced to a working position. At this time, the rotation member 23 is located in an abutment position where it abuts against the outer peripheral surface of the roll sheet 100. The elastic force of the elastic member 26b maintains the press-contact state between the rotation member 23 and the outer peripheral surface of the roll sheet 100 regardless of the winding diameter of the roll sheet 100. As has been described above, in this embodiment, the support member 24 is provided such that it can be displaced (pivot) between the retreat position and the working position, and the rotation member 23 is formed such that it can be displaced between the retreat position and the abutment position.

<Control Apparatus>

Figure 3:
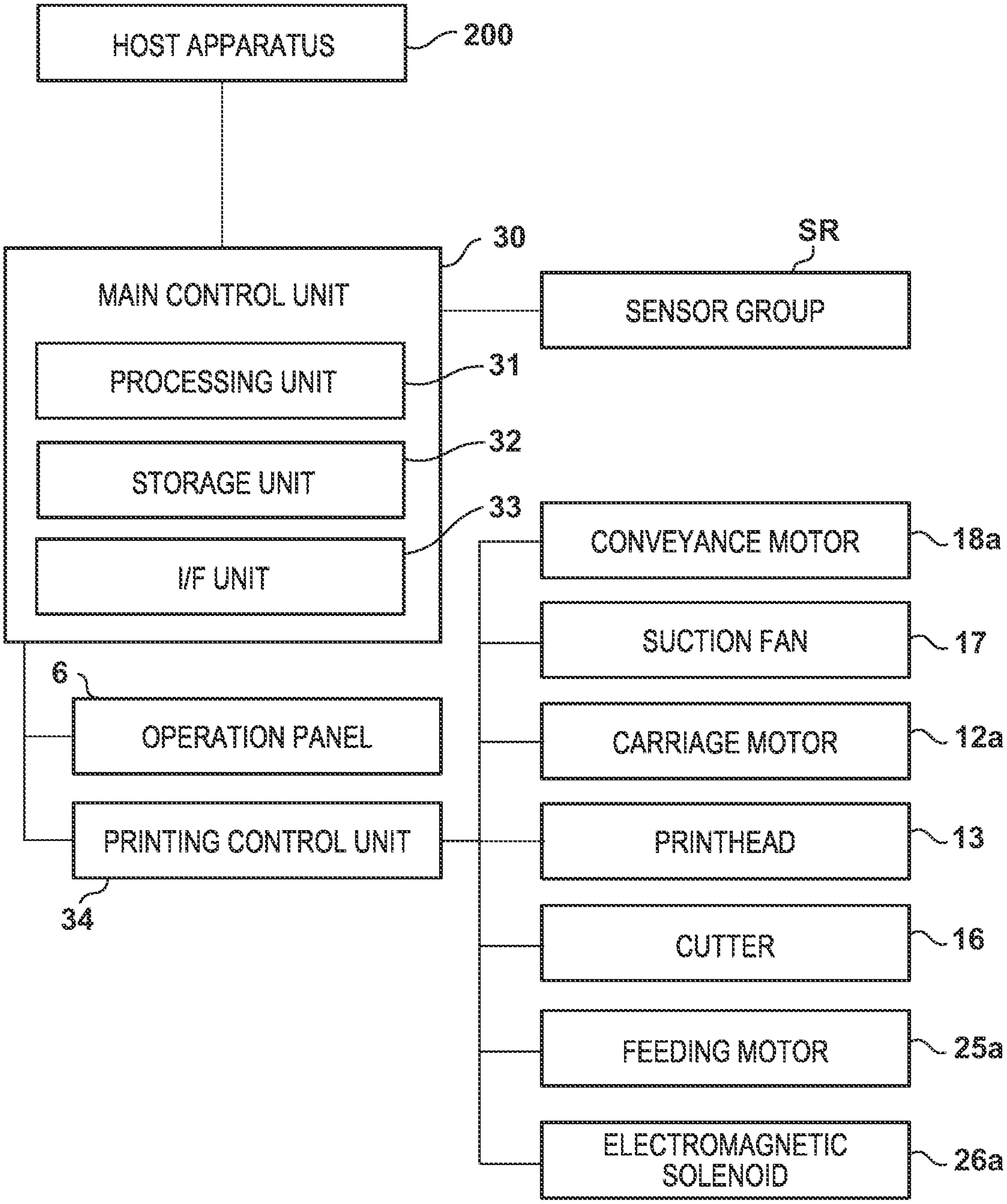
FIG. 3 is a block diagram of a control apparatus of the printing apparatus shown in FIG. 1.

With reference to FIG. 3, a control apparatus of the printing apparatus 1 will be described. The control apparatus includes a main control unit 30 and a printing control unit 34. The main control unit 30 receives image data and a print instruction thereof from a host apparatus 200, and performs a printing operation. The main control unit 30 includes a processing unit 31, a storage unit 32, and an interface unit (I/F unit) 33, and controls the entire printing apparatus 1. The processing unit 31 is a processor represented by a CPU, and executes programs stored in the storage unit 32. The storage unit 32 is a storage device such as a RAM or a ROM, and stores programs and data. By following instructions of the main control unit 30 based on detection results of a sensor group SR, the printing control unit 34 controls the conveyance motor 18a, the suction fan 17, the carriage motor 12a, the printhead 13, the cutter 16, the feeding motor 25a, the electromagnetic solenoid 26a, and the like. The sensor group SR includes a sensor 27 and the like to be described later.

<Setting of Roll Sheet>

Figure 4B:
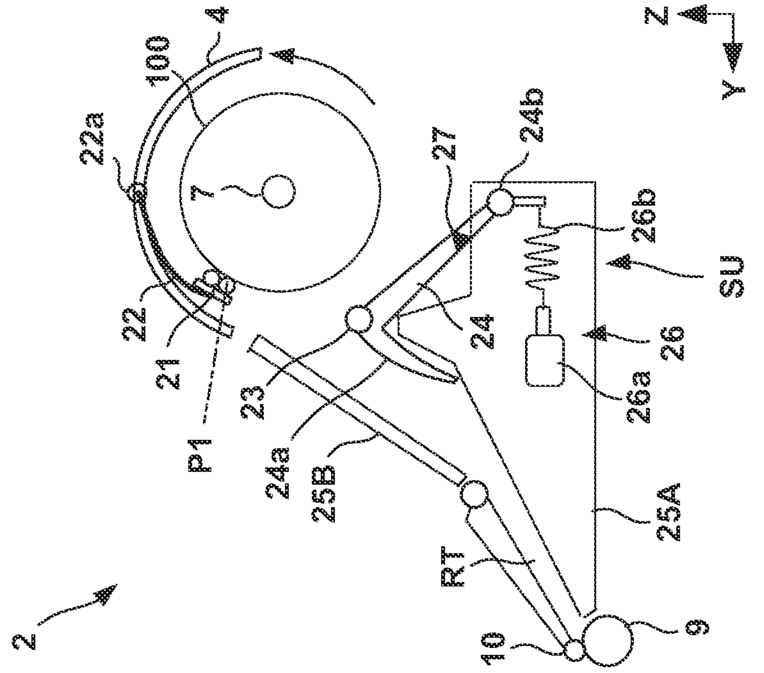
FIGS. 4A and 4B are views for explaining the operation of a feeding apparatus.
Figure 4A:
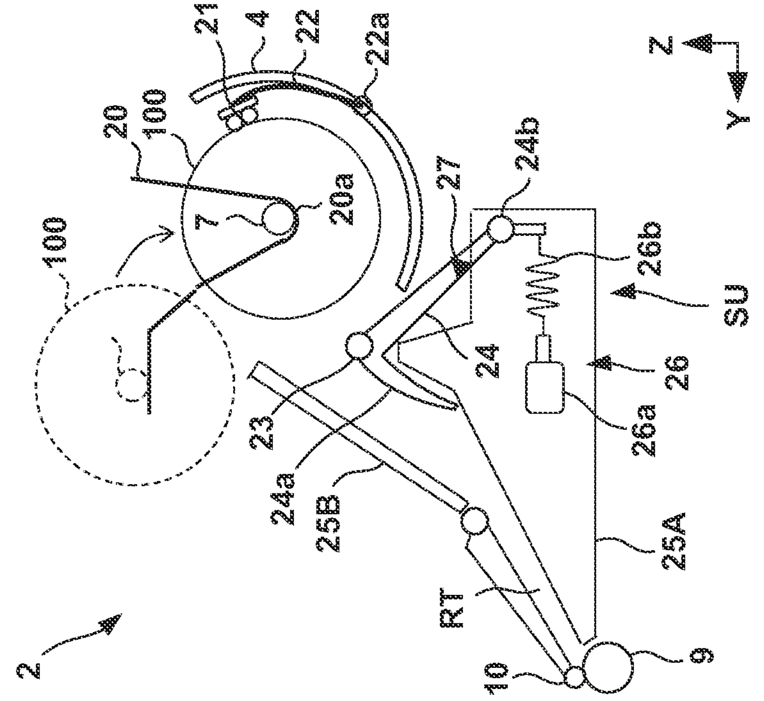

With reference to FIGS. 4A and 4B, a setting operation of the roll sheet 100 by the user and the arrangement of the components of the separation unit SU and the cover member 4 will be described.

In the cover member 4 according to this embodiment, both end portions thereof are pivotably supported by the main body of the printing apparatus, and the pivot center is set at almost the same position as the axial center of the spool shaft bearing of the holding portion 20a when viewed in the sectional direction. The cover member 4 can pivot around the pivot center and move between the cover position and the retreat position described above. FIG. 4A shows a state in which the cover member 4 is located in the retreat position, and FIG. 4B shows a state in which the cover member 4 is located in the cover position.

When the cover member 4 is located in the retreat position, the user can set the roll sheet 100 in the holding portion 20a. The user sets the roll sheet 100 in the holding portion 20a as shown in FIG. 4A, and moves the cover member 4 to the cover position as shown in FIG. 4B by a manual operation, thereby completing the setting.

On the inner surface of the cover member 4, an abutment portion 21 is supported via an arm member 22. The abutment portion 21 is provided such that it can abut against the outer peripheral surface of the roll sheet 100. In this embodiment, the abutment portion 21 abuts against the outer peripheral surface of the roll sheet 100 when the cover member 4 is located in the cover position as shown in FIG. 4B. The abutment portion 21 and the arm member 22 according to this embodiment form a set, and a plurality of the sets are arranged in the X direction so as to be spaced apart from each other. The abutment portion 21 of each set includes two nip rollers, which are free rotation members, that rotate following the rotation of the roll sheet 100. The two nip rollers are supported by the arm member 22 so as to be rotatable around the X-direction axis, and arrayed in the circumferential direction of the roll sheet 100. Although each abutment portion 21 includes the two nip rollers in this embodiment, it may include one nip roller or may include three or more nip rollers. Further, the abutment portion 21 is not limited to a roller and may be, for example, a ball caster or a pin with a spherical or arc-shaped distal end.

The arm member 22 is supported by the cover member 4 so as to be pivotable around the X-direction axis, and an elastic member 22a such as a torsion coil spring is provided in the root portion of the arm member 22. The elastic member 22a biases the arm member 22 in a direction in which the abutment portion 21 is pressed against the outer peripheral surface of the roll sheet 100. Note that, in order to press the abutment portion 21 against the outer peripheral surface of the roll sheet 100, the arm member 22 may be an elastic member. The arm member 22 is formed such that it pivots by an angle equal to or larger than the angle capable of coping with a change in winding diameter of the roll sheet 100. It is configured such that the tangent line between the abutment portion 21 and the outer peripheral surface of the roll sheet 100 is directed to the conveyance path RT regardless of the winding diameter of the roll sheet 100.

The feeding apparatus 2 includes the sensor 27 that detects the leading edge of the sheet S on the outer peripheral surface of the roll sheet 100. In this embodiment, the sensor 27 is provided on the support member 24. Since the sensor 27 is supported by the support member 24, the sensor 27 can detect the position of the leading edge of the sheet S regardless of a change in winding diameter of the roll sheet 100. Further, since the sensor 27 is provided on the support member 24, the sensor 27 can detect, at a position near the rotation member 23, reaching of the leading edge of the sheet S. Therefore, a distance L (to be described later) can be shortened.

The sensor 27 is a sensor whose output changes before and after the passage of the edge portion of the sheet S. For example, an optical sensor, a reflection PI sensor, a flag-type PI sensor, or the like can be used as the sensor 27. The optical sensor includes, for example, a light emitting element and a light receiving element. The light emitting element emits light to the outer peripheral surface of the roll sheet 100, and the light receiving element receives the reflected light. The light-receiving amount changes in accordance with the distance between the sensor 27 and the outer peripheral surface of the roll sheet 100. Therefore, the sensor 27 can detect the passage of the edge portion of the sheet S.

Figure 5A:
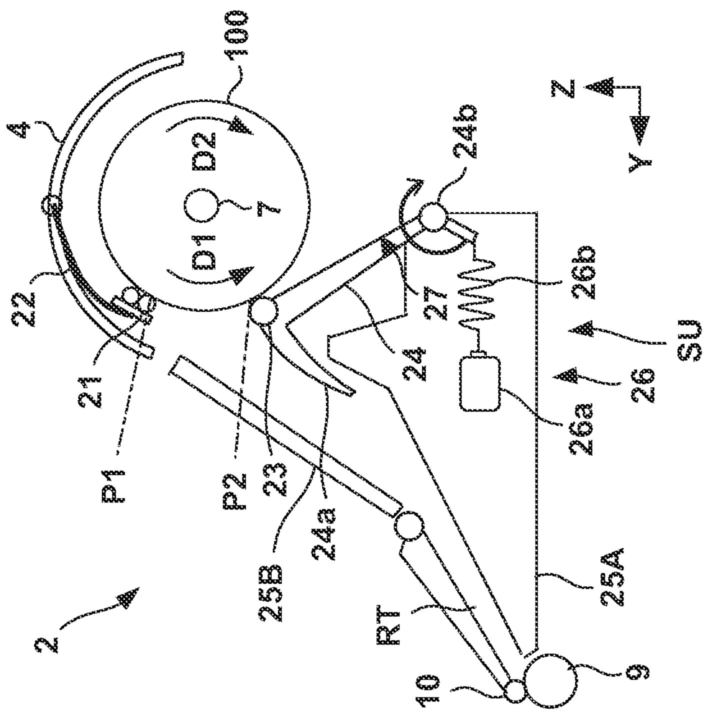
FIGS. 5A and 5B are views for explaining the operation of the feeding apparatus.

The arrangement of the abutment portion 21 and the rotation member 23 will be described. FIG. 5A shows a state in which the abutment portion 21 abuts against the outer peripheral surface of the roll sheet 100 and the support member 24 pivots to the working position so that the rotation member 23 abuts against the outer peripheral surface of the roll sheet 100.

The abutment portion 21 abuts against the outer peripheral surface of the roll sheet 100 at a position P1. The position P1 changes slightly in accordance with the winding diameter of the roll sheet 100. The rotation member 23 abuts against the outer peripheral surface of the roll sheet 100 at a position P2. The position P2 also changes slightly in accordance with the winding diameter of the roll sheet 100.

The positions P1 and P2 are set such that the leading edge of the sheet S is introduced into the conveyance path RT by passing between the position P1 and the position P2. In other word, the conveyance path RT is located at a height between the position P1 and the position P2. The positions P1 and P2 are arranged so as to span the entrance of the conveyance path RT. The position P1 is a position (upper position) on one end side of the entrance, and the position P2 is a position (lower position) on the other end side of the entrance. Further, in terms of the rotation direction D1 of the roll sheet 100 for feeding the sheet S, the position P2 is set at a position spaced apart from the position P1 in the D1 direction. With the arrangement relationship as described above, as will be described later, when the roll sheet 100 is set, the edge portion of the sheet S is automatically introduced into the conveyance path RT. Note that in some cases, rotation in the rotation direction D1 is referred to as forward rotation, and rotation in the reverse rotation direction D2 is referred to as reverse rotation.

<Automatic Introducing Operation>

Figure 7B:
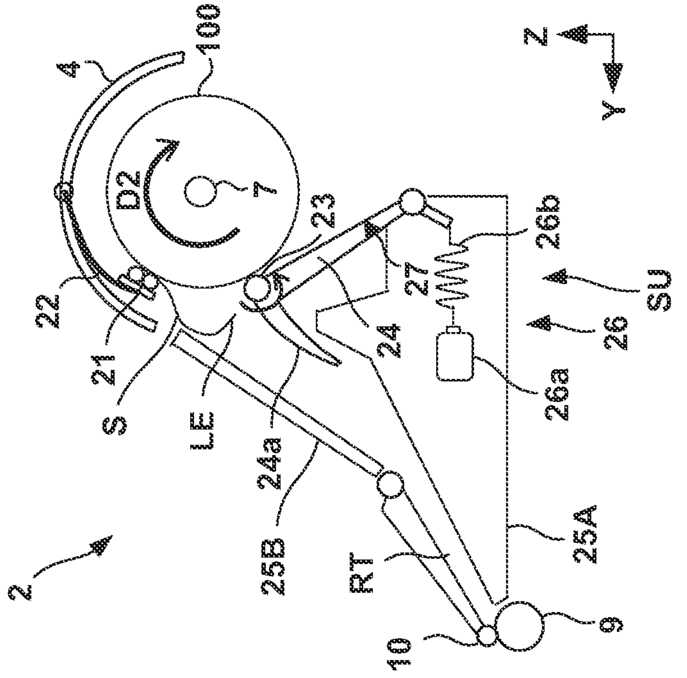
FIGS. 7A and 7B are views for explaining the operation of the feeding apparatus.

In this embodiment, as shown in FIG. 4B, an introducing operation is performed in which when the user sets the roll sheet 100, the leading edge of the sheet S is automatically introduced into the conveyance path RT. FIGS. 5A to 8C show an operational example of the automatic introducing operation. FIG. 9 is a flowchart showing an example of processing of the main control unit 30.

In step S1 of FIG. 9, it is determined whether the roll sheet 100 is set in the roll support unit 20. Setting of the roll sheet 100 can be determined based on a sensor (not shown) or a setting completion operation performed on the operation panel 6 by the user. If it is determined that the roll sheet 100 is set, the processing concerning the automatic introducing operation from step S2 is performed.

Figure 5B:
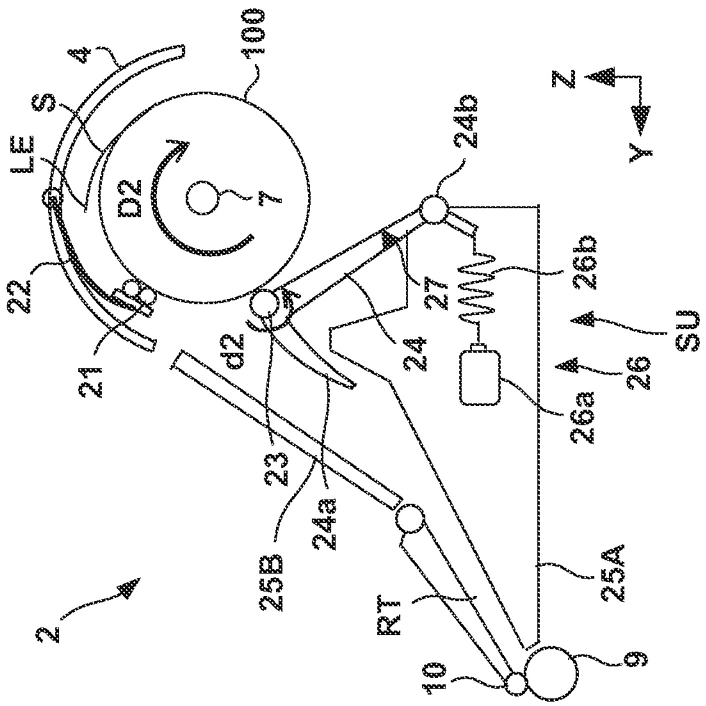

In step S2 of FIG. 9, as shown in FIG. 5A, the electromagnetic solenoid 26*a* is set in the driving state to displace the support member 24 to the working position. The rotation member 23 is located as the abutment position, and the rotation member 23 is pressed against the outer peripheral surface of the roll sheet 100. In step S3 of FIG. 9, as shown in FIG. 5B, the roll sheet 100 is rotated in the D2 direction (the direction of winding up the sheet S) by the drive unit 25. At this time, the rotation member 23 rotates in the d2 direction following the rotation of the roll sheet 100. During the rotation of the roll sheet 100, the detection result of the sensor 27 is monitored, and it is determined whether a leading edge LE of the sheet S is detected by the sensor 27 (step S4 of FIG. 9).

By rotating the roll sheet 100 once, the leading edge LE passes the sensor 27. Therefore, if the leading edge LE of the sheet S is not detected by the sensor 27, it is determined in step S12 of FIG. 9 whether the roll sheet 100 has been rotated once. The rotation amount of the roll sheet 100 can be determined from, for example, the rotation amount of the feeding motor 25*a*. If the roll sheet 100 has not been rotated once, the process returns to step S4; otherwise, the process advances to step S13 of FIG. 9.

In step S13 of FIG. 9, since the leading edge LE of the sheet S cannot be detected, a notification is made to prompt the user to manually introduce the sheet. The notification is made by, for example, display on the operation panel 6. Note that as the case in which the leading edge LE cannot be detected, for example, a case in which the roll sheet 100 includes no sheet S and only a core tube is set, or a case in which the leading edge LE is fixed to the outer peripheral surface of the roll sheet 100 with a tape or the like can be assumed.

Figure 6A:
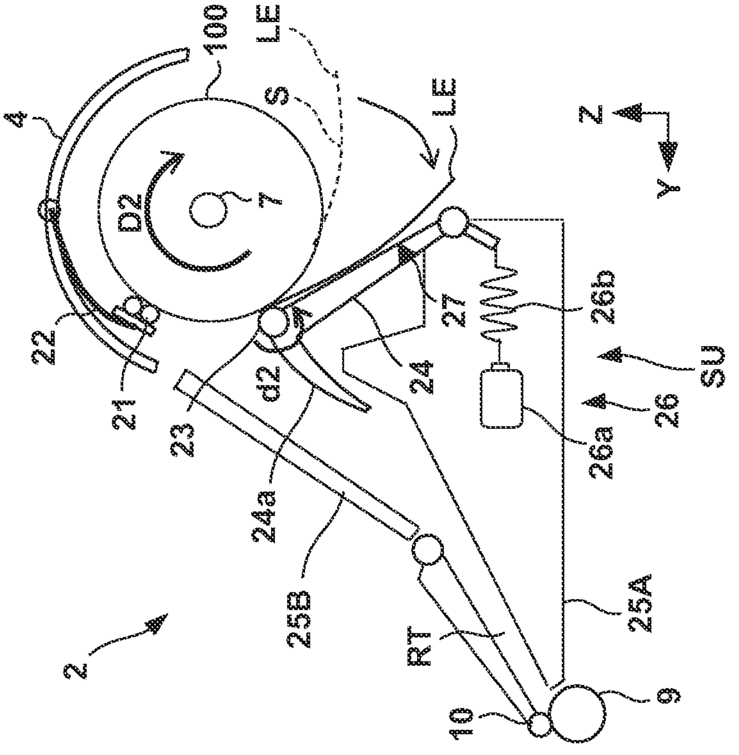
FIGS. 6A and 6B are views for explaining the operation of the feeding apparatus.
Figure 6B:
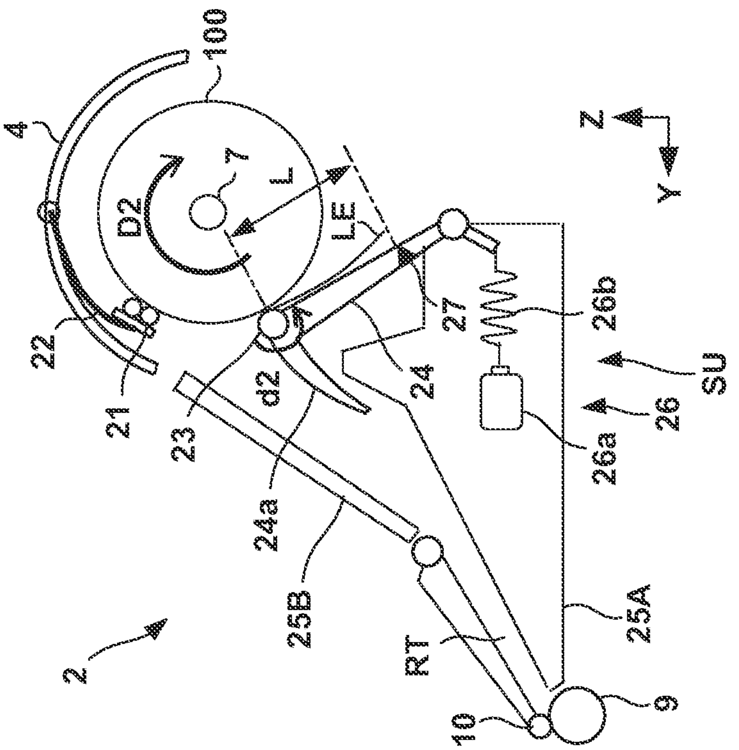

As shown in FIG. 6A, by the reverse rotation of the roll sheet 100, the leading edge LE of the sheet S moves clockwise, and the leading edge LE eventually reaches the sensor 27 as shown in FIG. 6B. If the leading edge LE is detected by the sensor 27, the process advances to step S5 of FIG. 9, and the rotation of the roll sheet 100 is stopped. When the leading edge LE is detected by the sensor 27, the leading edge LE is located at almost the same position as the sensor 27. Therefore, the distance L from the leading edge LE to the position P2 is a known distance (set value).

Figure 7A:
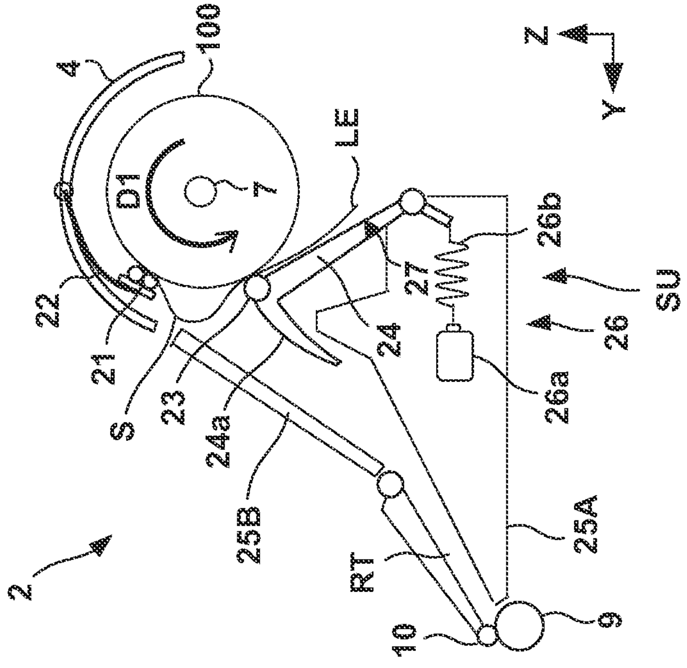
Figure 8A:
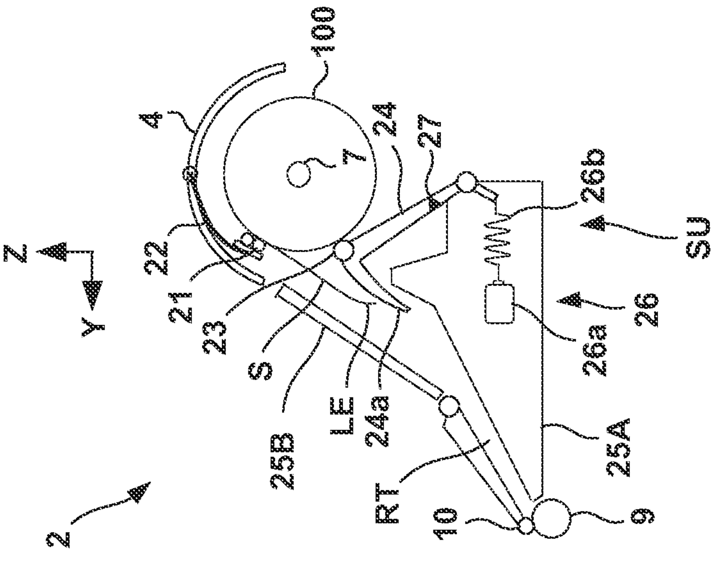
FIGS. 8A to 8C are views for explaining the operation of the feeding apparatus.

Then, in step S6 of FIG. 9, the roll sheet 100 is rotated in the D1 direction by a predetermined amount. The rotation member 23 does not follow the rotation of the roll sheet 100 in the D1 direction. Therefore, as shown in FIG. 7A, a slack (loop) of the sheet S is formed between the position P1 and the position P2. This will be described in more detail. Let N be the nip force of the rotation member 23, and $\mu 1$ be the friction coefficient of each of the obverse surface and reverse surface of the sheet S. At the abutment point of the rotation member 23, a conveyance force $F1=N\times\mu 1$ in the counterclockwise direction is generated with respect to the sheet S. Since the rotation member 23 does not follow the rotation of the roll sheet 100 in the D1 direction, a resistance force $F2=N\times\mu 2$ is generated, where $\mu 2$ is a friction coefficient between the sheet S and the rotation member 23.

When the specifications (surface material and shape) of the rotation member 23 are designed such that $F1<F2$ holds, the sheet S is not moved at the abutment point of the rotation member 23 but fed from the side of the abutment portion 21, so that the slack of the sheet S is formed between the position P1 and the position P2.

The size of the slack can be controlled by the conveyance amount of the sheet S, that is, the rotation amount of the roll sheet 100. The conveyance amount of the sheet S may be determined in advance by experiment or the like. Although the conveyance amount of the sheet S with respect to the rotation amount of the roll sheet 100 changes in accordance with the winding diameter of the roll sheet 100, for example, the average value of the rotation amount in the case of the maximum winding diameter and the rotation amount in the case of the minimum winding diameter may be used. Letting Dmax be the maximum winding diameter, Dmin be the minimum winding diameter, and Tp be the conveyance amount of the sheet S, the rotation amount $\theta p=4Tp/(Dmax+Dmin)$. At this time, the size of loop in the case of the maximum winding diameter is expressed by $Tpmax=2Dmax/(Dmax+Dmin)\times Tp$, and the size of loop in the case of the minimum winding diameter is expressed by $Tpmin=2Dmin/(Dmax+Dmin)\times Tp$.

After the forward rotation of the roll sheet 100 by the predetermined amount set as described above, the rotation is stopped, and the process advances to step S7 of FIG. 9. In step S7, the roll sheet 100 is rotated by a predetermined amount in the D2 direction. The rotation member 23 rotates following the rotation of the roll sheet 100 in the D2 direction. Therefore, while the slack between the position P1 and the position P2 is maintained, the portion of the sheet S on the side of the leading edge LE is wound around the roll sheet 100. If the sheet S is wound by the distance L shown in FIG. 6B, as shown in FIG. 7B, the leading edge LE of the sheet S passes the position P2 and comes out between the abutment portion 21 and the rotation member 23. Thus, the leading edge LE of the roll sheet 100 can be more reliably introduced into the conveyance path RT. Further, as shown in FIG. 8A, the sheet S returns to a flat shape due to its rigidity and is placed on the guide portion 24*a*. This allows the subsequent feeding operation to be performed smoothly.

The rotation amount of the roll sheet 100 is set such that the roll sheet 100 is rotated until the leading edge LE passes the position P2. The rotation amount may be determined in advance by an experiment or the like. Although the conveyance amount of the sheet S with respect to the rotation amount of the roll sheet 100 changes in accordance with the winding diameter of the roll sheet 100, for example, the rotation amount may be determined assuming the case of the minimum winding diameter. More specifically, letting θs be the rotation amount of the roll sheet 100, the rotation amount may be set such that θs=2L/Dmin holds. That is, the rotation amount is determined such that the leading edge LE of the sheet S is moved by a distance equal to or larger than the distance L. Thus, the leading edge LE reliably passes the rotation member 23 and is introduced into the conveyance path RT. Note that if the rotation amount is determined assuming the case of the minimum winding diameter, the conveyance amount of the sheet S in the case of the maximum winding diameter is expressed by conveyance amount=Dmax/Dmin×L. The shorter the distance L, the more advantageous in terms of a reduction in winding amount.

Figure 8B:
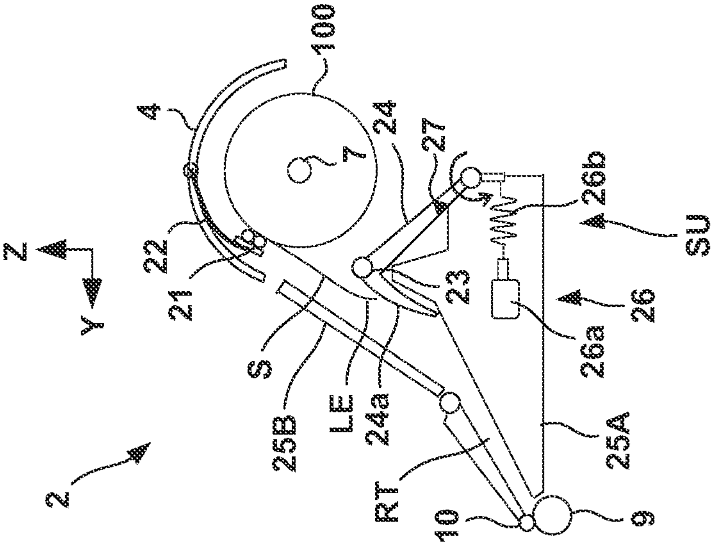
Figure 8C:
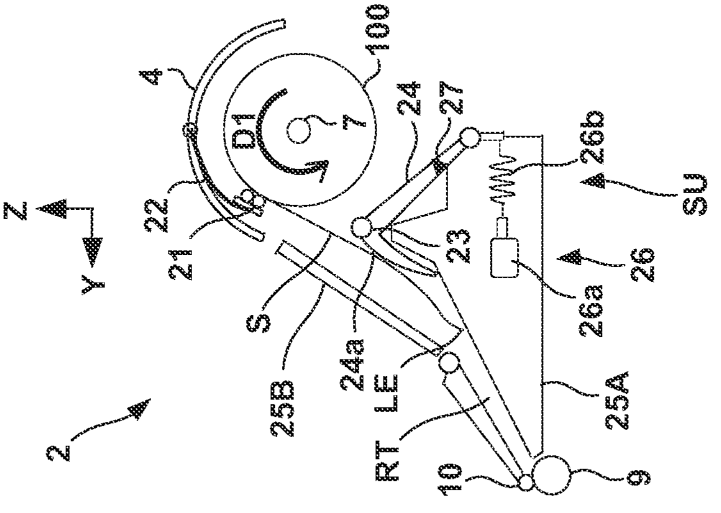
Figure 9:
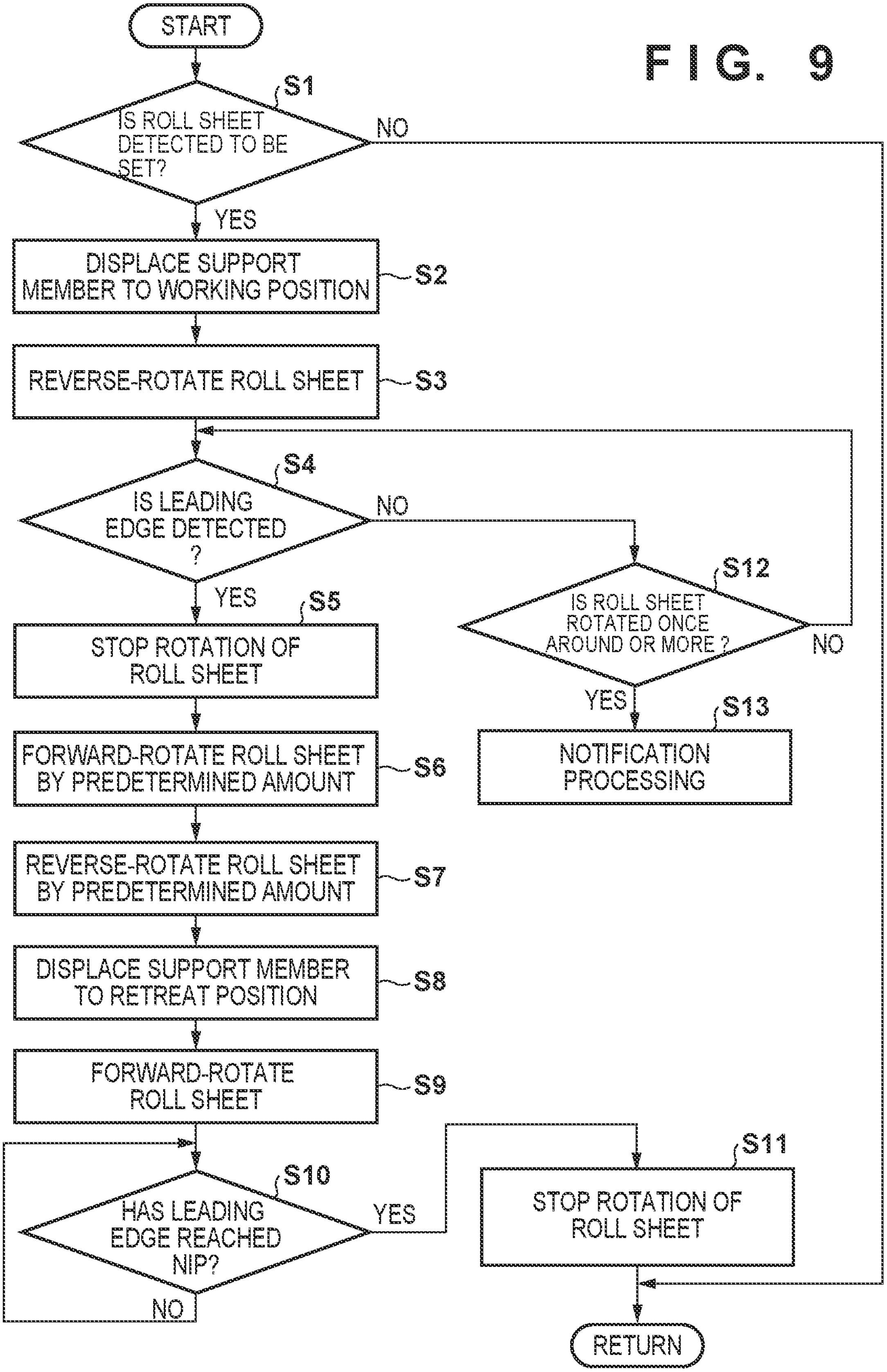
FIG. 9 is a flowchart illustrating an example of control processing of the feeding apparatus.

In step S8 of FIG. 9, the electromagnetic solenoid 26*a* is set in the non-driving state, and the support member 24 is displaced to the retreat position as shown in FIG. 8B. The rotation member 23 is displaced to the retreat position spaced apart from the roll sheet 100. In step S9 of FIG. 9, the roll sheet 100 is rotated in the D1 direction by the drive unit 25 and, as shown in FIG. 8C, the sheet S is fed into the conveyance path RT. In step S10 of FIG. 9, it is determined whether the leading edge LE of the sheet S has reached the nip portion between the conveying roller 9 and the driven roller 10. This determination is made based on the detection result of a sensor (not shown) arranged in the vicinity of the nip portion. If it is determined that the leading edge LE of the sheet S has reached the nip portion, the process advances to step S11, and the rotation of the roll sheet 100 is stopped. Thus, the printing apparatus 1 is set in the printing operation standby state.

Second Embodiment

Figure 10:
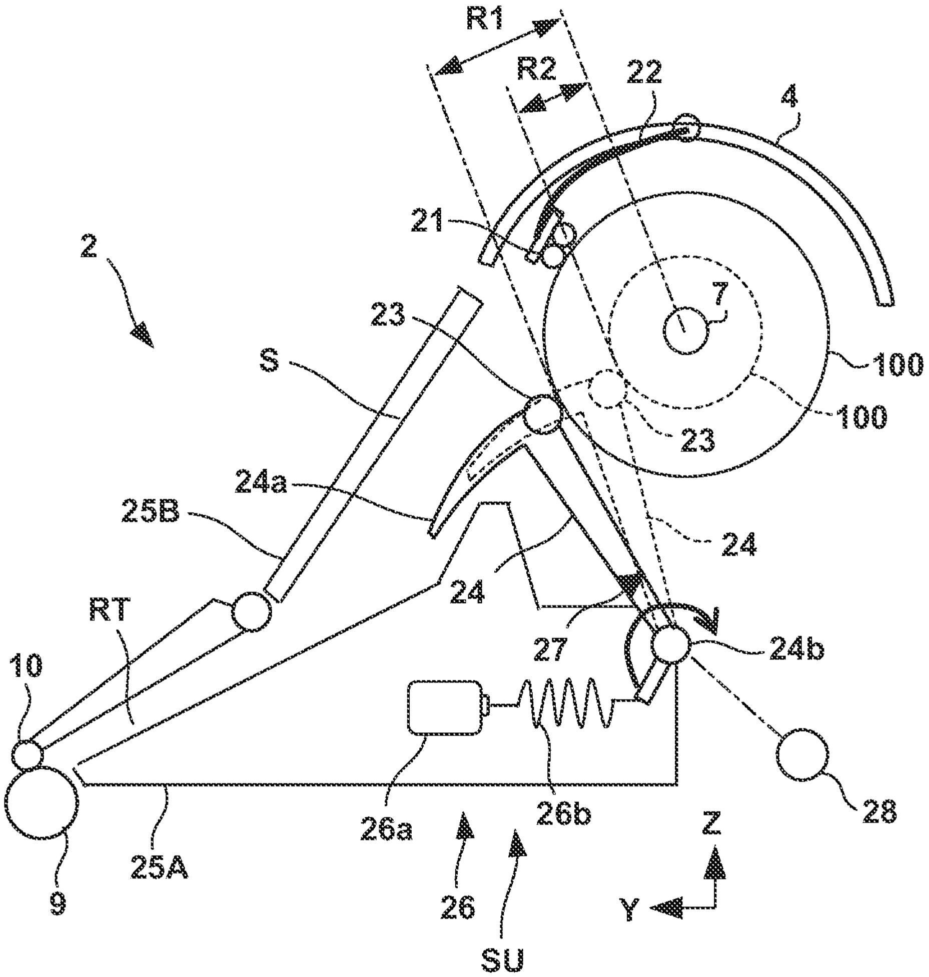
FIG. 10 is an explanatory view of another feeding apparatus.

A sensor that detects the winding diameter of the roll sheet 100 may be provided. FIG. 10 is an explanatory view showing an example of the sensor. The winding diameter of a roll sheet 100 is determined to be twice the distance between a rotation member 23 (particularly the abutment point) when the rotation member 23 is in the abutment position and the rotation center of the roll sheet 100. Accordingly, the winding diameter of the roll sheet 100 can be detected by detecting a parameter concerning this distance. In the arrangement according to this embodiment, the parameter is the pivot amount of a support member 24 pivoting from the retreat position to the working position. As shown in FIG. 10, the pivot amount of the support member 24 is larger in a case of the small winding diameter (a radius R2) of the roll sheet 100 than in a case of the large winding diameter (a radius R1) of the roll sheet 100. Therefore, a sensor 27 that detects the pivot amount of a pivot shaft 24*b* of the support member 24 is provided, and the winding diameter of the roll sheet 100 can be detected from the detection result of the sensor 27. The sensor 27 is, for example, an angle sensor such as a rotary encoder.

Figure 11:
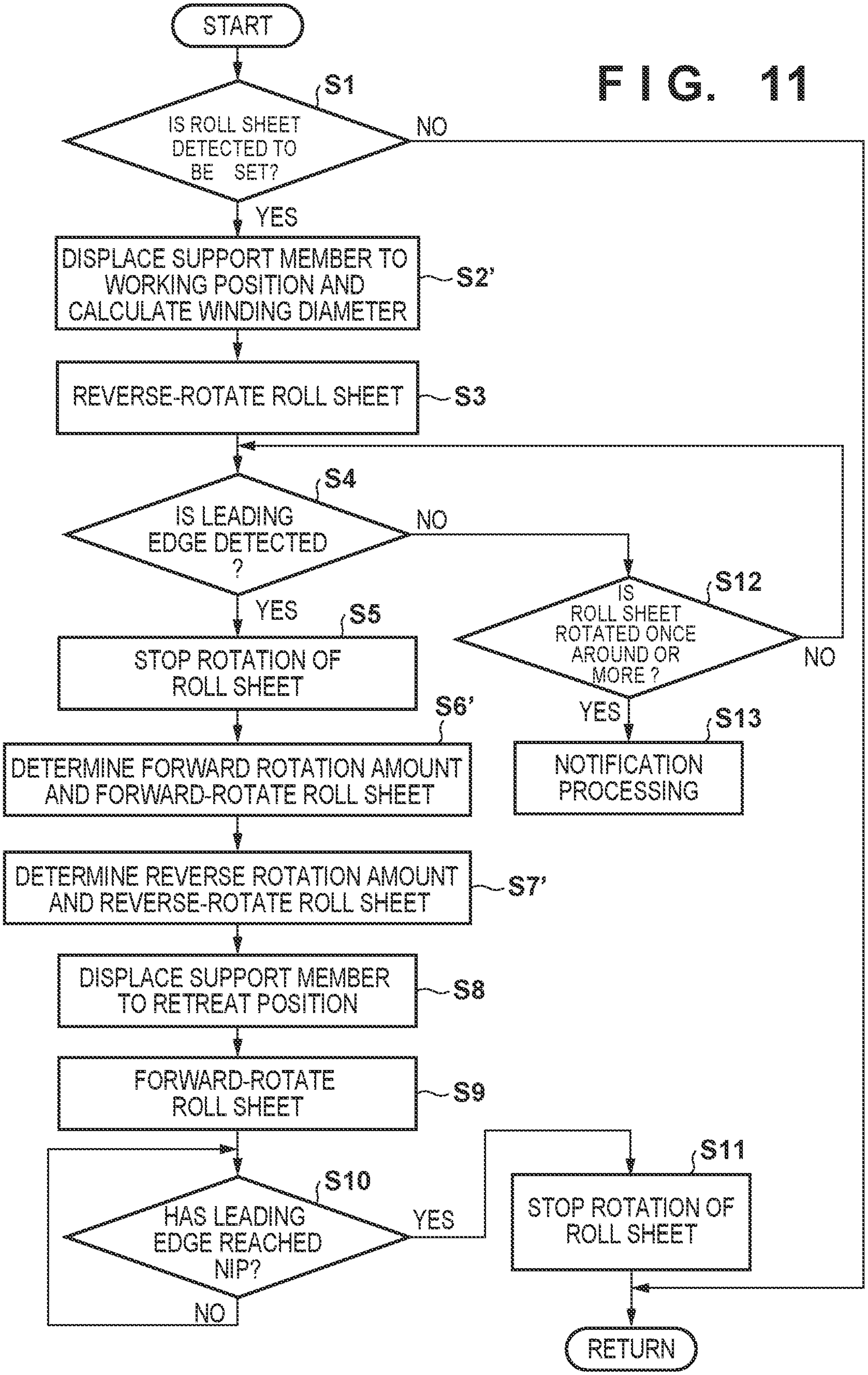
FIG. 11 is a flowchart illustrating an example of control processing of the feeding apparatus of the example shown in FIG. 10.

An example of control processing in the automatic introducing operation in this embodiment will be described with reference to FIG. 11. FIG. 11 illustrates the example of control processing in place of the example of processing illustrated in FIG. 9, and only the processing different from that in FIG. 9 will be described below.

After it is determined in step Si that the roll sheet 100 is set in a roll support unit 20, in step ST in place of step S2, an electromagnetic solenoid 26*a* is set in the driving state to displace the support member 24 to the working position. A rotation member 23 is located in the abutment position, and the rotation member 23 is pressed against the outer peripheral surface of the roll sheet 100. Further, the detection result of the sensor 27 is obtained, and a winding diameter D of the roll sheet 100 is calculated. The relationship between the pivot amount of the support member 24 (the detection result of the sensor 27) and the winding diameter D of the roll sheet 100 may be specified in advance. Alternatively, the calculation may be performed each time using the dimensions of the support member 24, the rotation center of the roll sheet 100, and the pivot amount of the support member 24 (the detection result of the sensor 27).

In step S6', the rotation amount by which the roll sheet 100 is to be rotated in a D1 direction is calculated. Letting Tp be the optimal conveyance amount of a sheet S to form a slack of the sheet S, which is obtained by experiment, the rotation amount can be calculated by rotation amount=2Tp/D. Then, the roll sheet 100 is rotated by the calculated rotation amount.

In step S7', the rotation amount by which the roll sheet 100 is to be rotated in a D2 direction is calculated. The rotation amount is calculated by rotation amount=2L/D. Then, the roll sheet 100 is rotated by the calculated rotation amount.

As has been described above, by providing the sensor 27 that detects the winding diameter of the roll sheet 100, the slack of the sheet S can be optimized. In the processing in step S7', the rewinding amount of the sheet S can be accurately adjusted to a distance L, and excessive rewinding of the sheet in a case of the large winding diameter is prevented. This can improve the degree of freedom of arrangement of the sensor 27.

Third Embodiment

Figure 12C:
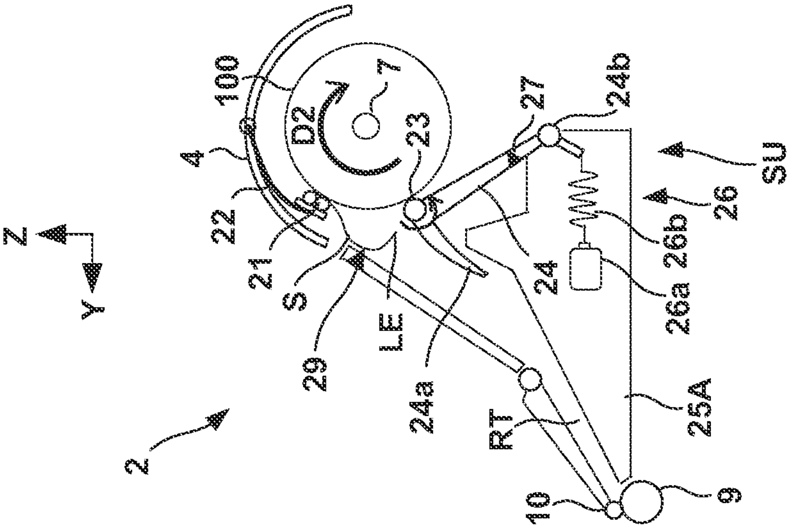
FIGS. 12A to 12C are explanatory views of still another feeding apparatus.
Figure 12B:
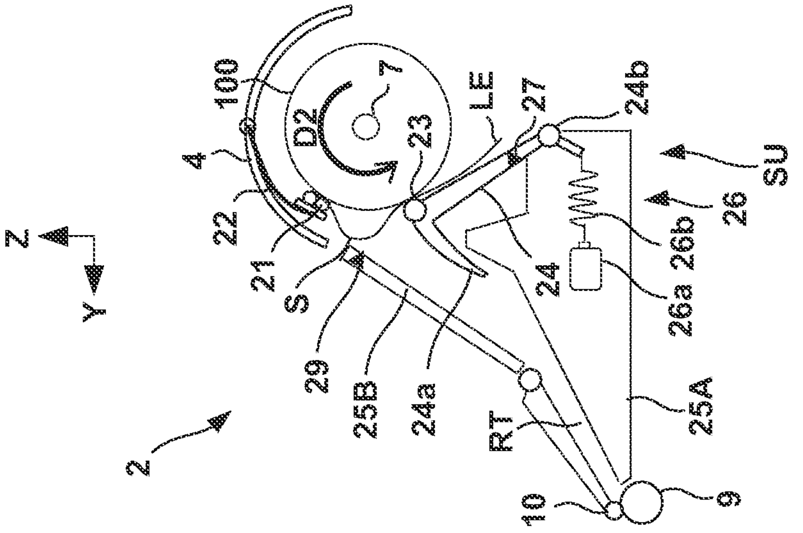
Figure 12A:
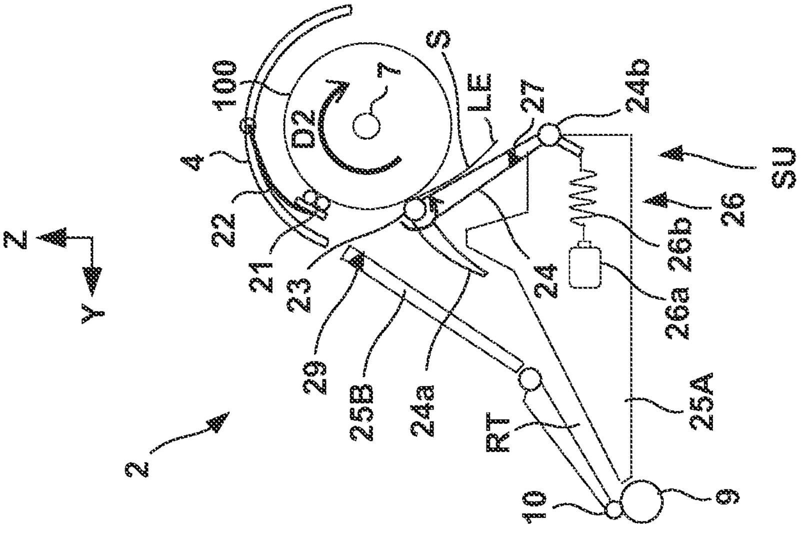

A sensor that detects the size of the slack of the sheet S formed between the position P1 and the position P2 may be provided. FIG. 12A is an explanatory view showing an example of the sensor. In the example shown in FIG. 12A, a sensor 29 is provided on an upper guide member 25B. The sensor 29 is located between an abutment portion 21 and a rotation member 23 (abutment position) on the side of a conveyance path RT. A sensor similar to a sensor 27 can be used as the sensor 29. For example, the sensor 29 is an optical sensor. A light emitting element emits light in the direction of the slack of a sheet S, and a light receiving element receives the reflected light. The light-receiving amount changes in accordance with the distance between the sensor 29 and the slack. The light receiving amount increases if the slack is large, and the light receiving amount decreases if the slack is small. Therefore, the size of the slack of the sheet S can be detected.

Figure 13:
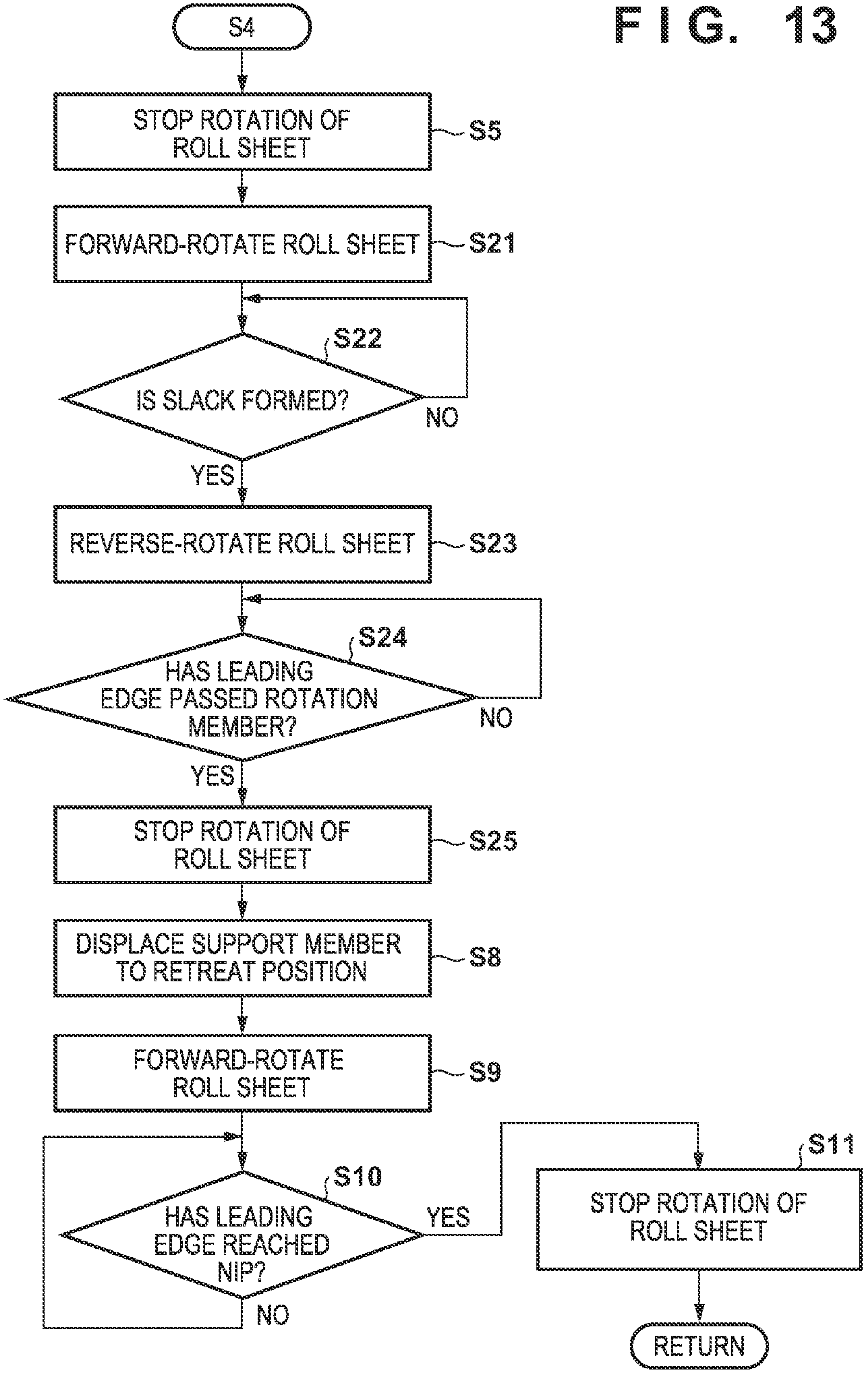
FIG. 13 is a flowchart illustrating an example of control processing of the feeding apparatus of the example shown in FIGS. 12A to 12C.

An example of control processing in the automatic introducing operation in this embodiment will be described with reference to FIG. 13. FIG. 13 illustrates the example of control processing in place of the example of processing from step S5 of FIG. 9, and only the processing different from that in FIG. 9 will be described below.

When the reverse rotation of a roll sheet 100 is stopped in step S5, the forward rotation of the roll sheet 100 is started in step S21. When the forward rotation of the roll sheet 100 is started, the detection result of the sensor 29 is monitored, and it is determined in step S22 whether the slack of the sheet S having a predetermined size has been formed between a position P1 and a position P2. The size of the slack, that is, the threshold value of the detection result of the sensor 29 is obtained in advance by an experiment or the like and set. FIG. 12B schematically shows a situation in which the slack is formed and detected by the sensor 29.

If it is determined in step S22 that the slack having the predetermined size has been formed, reverse rotation of the roll sheet 100 is started in step S23. When the reverse rotation of the roll sheet 100 is started, the detection result of the sensor 29 is monitored, and it is determined in step S24 whether a leading edge LE of the sheet S has passed the rotation member 23. That is, the sensor 29 is also used as a sensor for determining passage of the leading edge LE. If the leading edge LE passes a position P2, the leading edge LE becomes a free edge as shown in FIG. 12C. The slack of the sheet S is eliminated and, as shown in FIG. 8A, the sheet S returns to a flat shape due to its rigidity and is placed on a guide portion 24*a*. Since the light receiving amount of the sensor 29 decreases, it can be determined that the leading edge LE has passed the rotation member 23. The threshold value of the detection result of the sensor 29 for this determination is obtained in advance by an experiment or the like and set.

If it is determined in step S24 that the leading edge LE has passed the rotation member 23, the rotation of the roll sheet 100 is stopped in step S25. The subsequent processing from step S8 to step S11 is similar to that in the example shown in FIG. 9.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-043331, filed Mar. 12, 2020, which is hereby incorporated by reference herein in its entirety.

What is claimed is:

1. A feeding apparatus comprising a roll supporter configured to rotatably support a roll sheet which is a sheet wound into a roll form;

a drive unit including a motor as a driving source and configured to rotate the roll sheet supported by the roll supporter in a first rotation direction for feeding the sheet from the roll sheet into a conveyance path and a second rotation direction reverse to the first rotation direction;

an abutment body provided so as to be capable of abutting against an outer peripheral surface of the roll sheet at a first position; and a roller provided so as to be displaceable to an abutment position where the roller abuts against the outer peripheral surface of the roll sheet at a second position separated apart from the first position in the first rotation direction, and a retreat position where the roller does not abut against the outer peripheral surface, wherein the drive unit rotates the roll sheet in the first rotation direction to introduce, into the conveyance path, a leading edge of the sheet having passed between the first position and the second position, and the roller at the second position does not rotate with the roll sheet when the roll sheet is rotated in the first rotation direction, and rotates with the roll sheet when the roll sheet is rotated in the second rotation direction.

2. The apparatus according to claim 1, wherein, the first position and the second position are set such that the leading edge of the sheet is introduced into the conveyance path by passing between the first position and the second position, and when the leading edge of the sheet is to be introduced into the conveyance path, in a state in which the abutment body abutting against the outer peripheral surface, the roller abutting against the outer peripheral surface, and the leading edge of the roll sheet are located in an order mentioned in the first rotation direction, the drive unit rotates the roll sheet in the first rotation direction such that a slack of the sheet is formed between the first position and the second position, and then rotates the roll sheet in the second rotation direction until the leading edge passes the second position.

3. The apparatus according to claim 2, further comprising:
a winding diameter detection unit configured to detect a winding diameter of the roll sheet,
wherein the drive unit determines, based on a detection result of the winding diameter detection unit, a rotation amount by which the roll sheet is to be rotated in the first rotation direction and a rotation amount by which the roll sheet is to be rotated in the second direction upon introducing the leading edge of the sheet into the conveyance path.

4. The apparatus according to claim 3, wherein
the winding diameter detection unit detects a parameter concerning a distance between the roller in the abutment position and a rotation center of the roll sheet.

5. The apparatus according to claim 2, further comprising:
a slack detection unit configured to detect a size of the slack of the sheet formed between the first position and the second position,
wherein the drive unit stops, based on a detection result of the slack detection unit, the rotation of the roll sheet in the first rotation direction upon introducing the leading edge of the sheet into the conveyance path.

6. The apparatus according to claim 1, wherein
the abutment body includes at least one free rotation member configured to rotate following rotation of the roll sheet.

7. The apparatus according to claim 1, further comprising:
a leading edge detection unit configured to detect the leading edge of the sheet before the leading edge of the sheet is introduced into the conveyance path.

8. The apparatus according to claim 7, wherein
the drive unit determines, based on a detection result of the leading edge detection unit, a rotation amount by which the roll sheet is to be rotated in the second direction upon introducing the leading edge of the sheet into the conveyance path.

9. The apparatus according to claim 8, wherein
the drive unit determines a rotation amount by which the roll sheet is to be rotated in the second rotation direction such that the leading edge of the sheet is moved by a distance not less than a distance between a position of the leading edge of the sheet based on a detection result of the leading edge detection unit and the second position.

10. The apparatus according to claim 7, further comprising:
a support member configured to support the roller,
wherein the support member is provided so as to be capable of pivoting to a working position where the roller is located at the abutment position, and a second retreat position where the roller is located at the retreat position, and
the leading edge detection unit is supported by the support member.

11. The apparatus according to claim 1, wherein
the roller includes a one-way clutch so that the roller does not follow rotation of the roll sheet in the first rotation direction, but rotates following rotation of the roll sheet in the second rotation direction.

12. The A printing apparatus according to claim 1, further comprising:
a printing unit configured to print an image on a sheet fed from the roll sheet supported by the roll supporter.

13. A feeding apparatus comprising:
a roll supporter configured to rotatably support a roll sheet which is a sheet wound into a roll form;
a drive unit including a motor as a driving source and configured to rotate the roll sheet supported by the roll supporter in a first rotational direction for feeding the sheet from the roll sheet into a conveyance path and a second rotation direction reverse to the first rotation direction;
a cover member configured to cover the roll sheet supported by the roll supporter;
an abutment body provided so as to be capable of abutting against an outer peripheral surface of the roll sheet at a first position; and
a roller configured to abut against the outer peripheral surface at a second position different from the first position,
wherein the abutment body is supported by the cover member via an arm member, and biased to the outer peripheral surface of the roll sheet by an elastic member,
the drive unit rotates the roll sheet in the first rotation direction to introduce, into the conveyance path, a leading edge of the sheet having passed between the first position and the second position, and
the roller at the second position does not rotate with the roll sheet when the roll sheet is rotated in the first rotation direction, and rotates with the roll sheet when the roll sheet is rotated in the second rotation direction.

14. The apparatus according to claim 13, wherein
the roller includes a one-way clutch so that the roller does not follow rotation of the roll sheet in the first rotation direction, but rotates following rotation of the roll sheet in the second rotation direction.

15. The apparatus according to claim 13, further comprising:
a leading edge detection unit configured to detect the leading edge of the sheet before the leading edge of the sheet is introduced into the conveyance path.

16. The apparatus according to claim 13, further comprising:
a printing unit configured to print an image on the sheet fed from the roll sheet supported by the roll supporter.

17. A feeding apparatus comprising:
a roll supporter configured to rotatably support a roll sheet which is a sheet wound into a roll form;
a drive unit including a motor as a driving source and configured to rotate the roll sheet supported by the roll supporter in a first rotation direction for feeding the sheet from the roll sheet into a conveyance path and a second rotation direction reverse to the first rotation direction;
an abutment body provided so as to be capable of abutting against an outer peripheral surface of the roll sheet at a first position; and
a roller configured to abut against the outer peripheral surface at a second position different from the first position,
wherein the drive unit rotates the roll sheet in the first rotation direction to introduce, into the conveyance path, a leading edge of the sheet having passed between the first position and the second position,
the roller at the second position does not rotate with the roll sheet when the roll sheet is rotated in the first rotation direction, and rotates with the roll sheet when the roll sheet is rotated in the second rotation direction,
the abutment body is located at a position higher than the roller, and
an entrance of the conveyance path is located at a height between the abutment body and the roller.

18. The apparatus according to claim 17, wherein the roller includes a one-way clutch so that the roller does not follow rotation of the roll sheet in the first rotation direction, but rotates following rotation of the roll sheet in the second rotation direction.

19. The apparatus according to claim 17, further comprising:

a leading edge detection unit configured to detect the leading edge of the sheet before the leading edge of the sheet is introduced into the conveyance path.

20. The apparatus according to claim 17, further comprising:

a printing unit configured to print an image on the sheet fed from the roll sheet supported by the roll supporter.

* * * * *